(No Model.)
N. CUNNINGHAM.
HORSE COLLAR.
No. 522,685. Patented July 10, 1894.
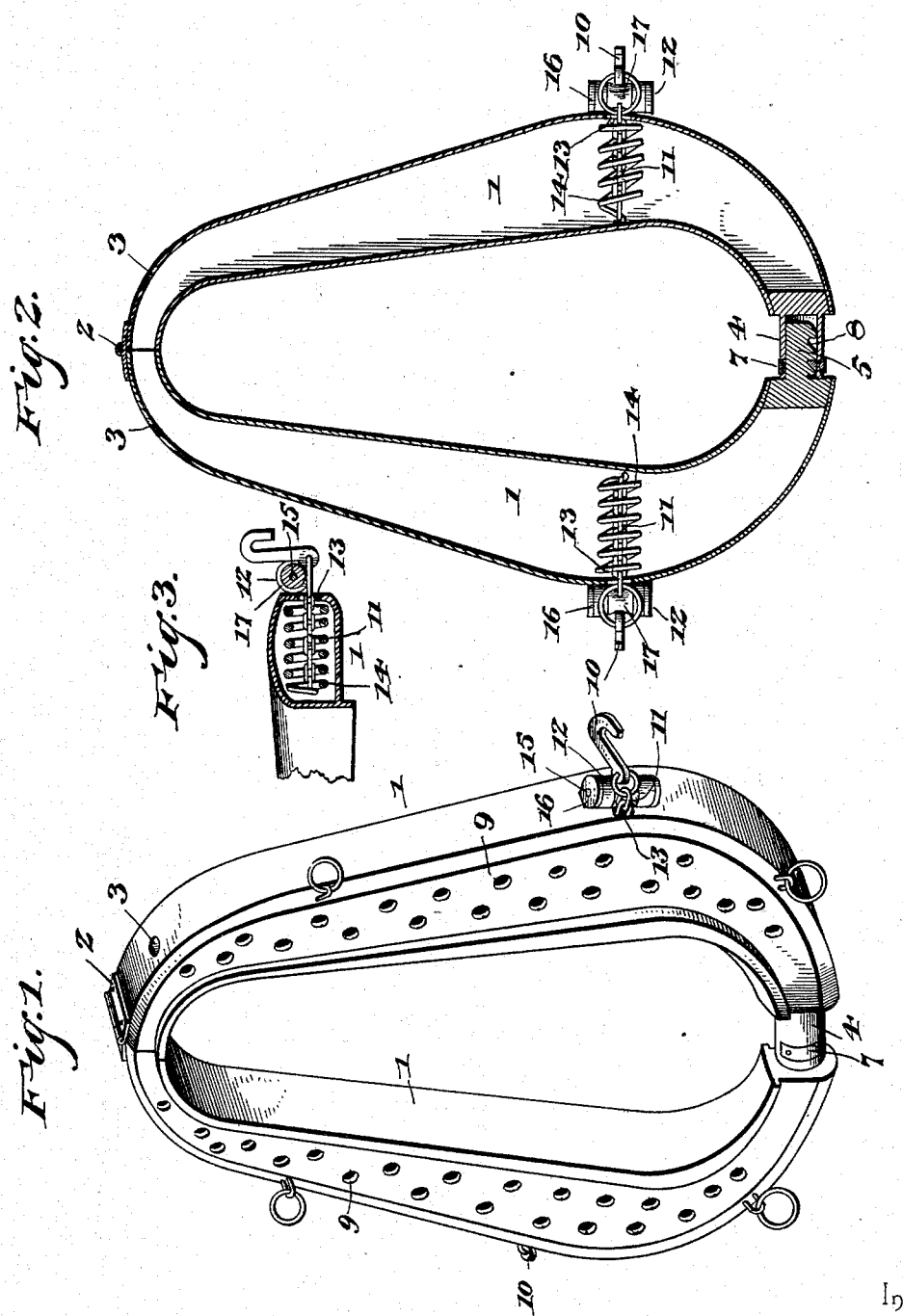
Inventor
Newton Cunningham,
Witnesses
B. S. Ober
N. F. Riley
By his Attorneys.
C. A. Snow & Co.

UNITED STATES PATENT OFFICE.

NEWTON CUNNINGHAM, OF SUTTON, WEST VIRGINIA.

HORSE-COLLAR.

SPECIFICATION forming part of Letters Patent No. 522,685, dated July 10, 1894.

Application filed February 23, 1894. Serial No. 501,174. (No model.)

*To all whom it may concern:*

Be it known that I, NEWTON CUNNINGHAM, a citizen of the United States, residing at Sutton, in the county of Braxton and State of West Virginia, have invented a new and useful Horse-Collar, of which the following is a specification.

The invention relates to improvements in horse collars.

The objects of the present invention are to improve the construction of horse collars, to increase their strength and durability, and to provide one adapted to be used either with or without hames.

A further object of the invention is to cushion the hame hooks, and prevent the harness from being broken, strained or otherwise injured by a sudden pull or start.

The invention consists in the construction and novel combination and arrangement of parts hereinafter fully described, illustrated in the accompanying drawings and pointed out in the claims hereto appended.

In the drawings—Figure 1 is a perspective view of a horse collar, constructed in accordance with this invention. Fig. 2 is a longitudinal sectional view. Fig. 3 is a transverse sectional view of one side of the collar.

Like numerals of reference indicate corresponding parts in all the figures of the drawings.

1 designates a horse collar designed to be employed in connection with hames or without the same, and constructed of sheet metal or similar material. The sides of the horse collar are of similar construction; they are hinged at the top, and detachably connected at their lower ends. They are provided at their upper ends at opposite ends of the hinge 2 with sockets 3, adapted to receive suitable hame tops or knobs, designed to be employed when the collar is used without hames.

The locking device for detachably securing the lower ends of the sides of the collar, preferably consists of a socket 4 secured to one of the sides of the collar, and a rack bar or shank 5 secured to the other side; the rack bar or shank fits into the socket, and is adapted to have either of the shoulders engaged by a spring actuated catch 7, mounted on the socket, and having a projection operating through an opening of the same to engage either of the shoulders 8. By this construction the sides of the collar are adjustably connected to fit different sizes of horses.

The sides of the collar are hollow; their front hame receiving faces are provided with tool openings 9; and their rounded faces which fit against the neck of an animal are adapted to be depressed to relieve a sore or injured portion of a horse or other draft animal from pressure; and the openings 9 are of a size to permit a suitable tool to be introduced into the collar for the purpose of forcing outward a depressed portion after an injury has healed.

The collar is provided at opposite sides with hame hooks 10, which are attached to the outer ends of chains 11; the chains are arranged on vertically disposed rollers 12, and extend into the collar through openings 13; and the inner ends of the chains are connected to the springs 14, which cushion the hooks, and prevent the harness from being strained, broken or otherwise injured by a sudden start or pull. The rollers are provided at their ends with journals 15, arranged in bearing eyes 16 projecting out horizontally from the sides of the collar. The vertically disposed rollers are annularly grooved at 17 to form seats for the chain, to enable the latter to readily run over them.

It will be seen that the collar is simple and comparatively inexpensive in construction, that it is strong and durable, and that its hame hooks are cushioned to relieve the harness from sudden strains.

Changes in the form, proportion, and the minor details of construction may be resorted to without departing from the principle or sacrificing any of the advantages of this invention.

What I claim is—

1. A hollow horse collar provided at opposite sides with openings combined with springs arranged within the collar, vertical rollers journaled on the exterior of the collar, chains arranged on the rollers and passing through the openings of the collar and having their inner ends connected to said springs, and hame hooks attached to the outer ends of the chains, substantially as described.

2. A hollow horse collar provided at opposite sides with openings and having springs arranged within it, combined with hame hooks provided with chains passing through the openings of the collar and connected with said springs, and vertically disposed rollers having annular grooves to receive the chains and provided at their ends with journals arranged in bearings of the collar, substantially as described.

3. A hollow horse collar constructed of sheet metal and provided at its front face with tool openings, the rear faces of the collar being depressible to relieve an injured portion of an animal from pressure, said openings being of a size to permit the introduction of a tool to straighten a depressed portion, substantially as described.

In testimony that I claim the foregoing as my own I have hereto affixed my signature in the presence of two witnesses.

NEWTON CUNNINGHAM.

Witnesses:
H. E. BLAND,
D. E. DENT.